United States Patent
Wolff

[15] 3,701,097
[45] Oct. 24, 1972

[54] DECODING BAR PATTERNS
[72] Inventor: Gerald Wolff, Framingham, Mass.
[73] Assignee: Identicon Corporation, Waltham, Mass.
[22] Filed: Jan. 20, 1971
[21] Appl. No.: 107,996

Related U.S. Application Data

[63] Continuation-in-part of Ser. No. 44,910, June 10, 1970.

[52] U.S. Cl. ................340/146.3 Z, 235/61.11 E, 235/61.12 N; 250/219 D
[51] Int. Cl. .............................................G06k 9/00
[58] Field of Search ..340/146.3; 235/61.11 E, 61.12; 250/219, 219 D, 219 WD

[56] References Cited
UNITED STATES PATENTS 3,309,667  3/1967  Feissel et al. ...........340/146.3
3,286,233  11/1966  Lesueur.................340/146.3
3,089,122  5/1963  Seehof et al. ...........340/146.3

*Primary Examiner*—Maynard R. Wilbur
*Assistant Examiner*—Leo H. Boudreau
*Attorney*—Charles Hieken

[57] ABSTRACT

A photoelectric detector and width-coded bar or interval are relatively displaced to produce a corresponding sequence of pulses or pulse intervals of timed duration corresponding to the pattern with variation in the scan velocity. A logical circuit arrangement recalibrates during a scan interval so that the width patterns are accurately detected, despite the variation in scan velocity resulting from relatively displacing the photoelectric detector and pattern to be detected manually.

13 Claims, 3 Drawing Figures

PATENTED OCT 24 1972 3,701,097
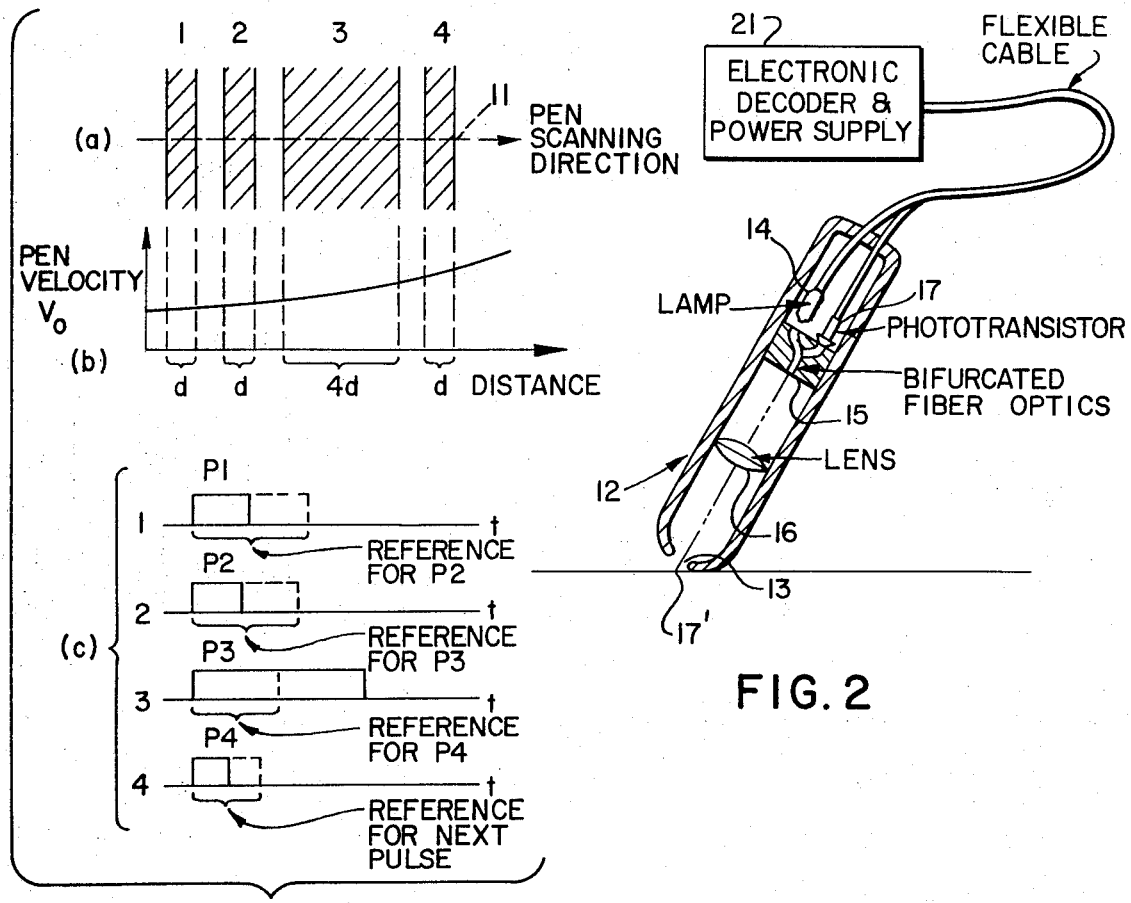
FIG. 1
FIG. 2
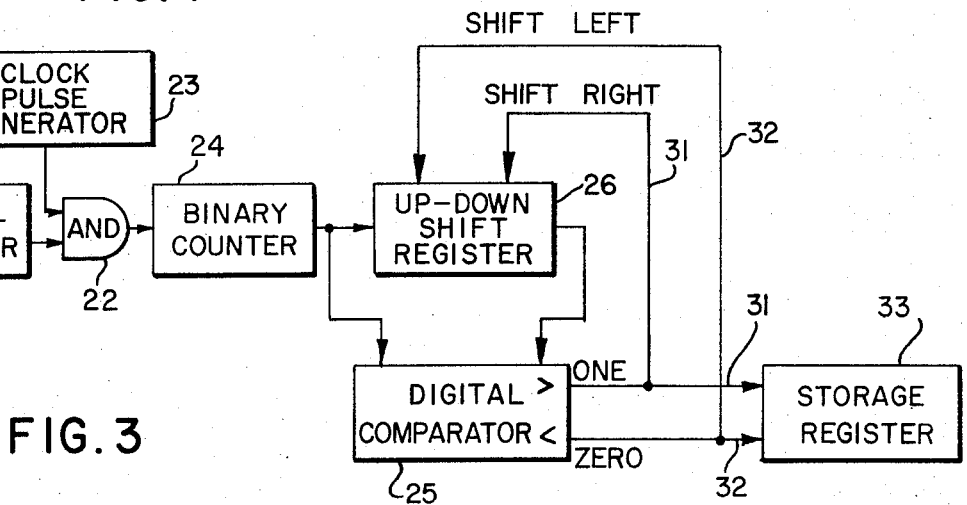
FIG. 3
INVENTOR
GERALD WOLFF
BY
Charles Hieken
ATTORNEY

DECODING BAR PATTERNS

REFERENCE TO PRIOR COPENDING APPLICATION

This application is a continuation-in-part of application Ser. No. 44,910 filed June 10, 1970, entitled OPTICAL LABEL SCANNING.

BACKGROUND OF THE INVENTION

The present invention relates in general to decoding bar or interval patterns and more particularly concerns novel apparatus and techniques for decoding such patterns when they are scanned at a variable velocity, such as when scanning manually. The invention is especially useful in connection with semiautomatic label identification systems that may be manually scanned with a light pen reader to produce an electrical signal characteristic of the label thus scanned.

Width-coded bars or intervals represent a convenient encoding technique for use with optical reading devices. Typically, a scanning system comprising a photoelectric detector scans the pattern of this type to produce a train of pulses or pulse intervals of timed duration corresponding to the pattern width variations and the scan velocity. If the scan rate is constant, the correspondence between the timed durations and the pattern scanned remains fixed to facilitate decoding.

Although the angular scan rate may be constant as it traverses a pattern, the linear scanning rate may vary from pattern to pattern if the distance between pattern and scanner is not fixed, a situation usually encountered in practice. The commercially available IDENTISCAN label reader (produced and marketed by IDENTICON Corporation of Waltham Massachusetts) represents one solution to this problem. In this system an initial bar width serves as reference calibration for all succeeding bars with the calibration being reestablished on each scan effected by a mirror rotating at constant speed.

Although that system works well for scanning the labels on a number of items moving by, there are situations when it is desired to manually scan a label. Necessarily, it is difficult to then maintain the scan rate constant over the scan interval. The use of "pen readers" for manual optical scanning is useful in such applications as document and book identification, inventorying and point-of-sale item identification. Present techniques include using multicolor labels with appropriate spectral filtering and multi-detectors in the pen reader system, or mechanical methods of generating a constant rate scan within a hand-held device that is held stationary relative to the label being scanned. A disadvantage of such systems is their complexity and cost.

Accordingly, it is an important object of this invention to provide apparatus and techniques for manually scanning width-coded patterns.

It is another object of the invention to achieve the preceding object while overcoming disadvantages of prior art devices.

It is a further object of the invention to achieve one or more of the preceding objects with apparatus capable of reading single color (black-and-white) labels that are simple and inexpensive to print with only a single detector channel and without mechanical scanning aids to help keep costs low and reliability high.

It is a further object of the invention to achieve one or more of the preceding objects with apparatus that is relatively easy to use by unskilled personnel and provide reliable output signals.

SUMMARY OF THE INVENTION

According to the invention, there are transducing means responsive to contrasting media for providing corresponding electrical signals, and means for relatively displacing the transducing means and an area having the contrasting media to be scanned to produce electrical signals representative of the width of intervals defined by the contrasting media. The width of intervals defined by the contrasting media is representative of encoded information. Means are provided for repeatedly calibrating interpretative circuitry during the course of a scan by reference to a prior interval that was identified to accurately decode the encoded information in the presence of variations in the scanning rate during a scan of the area.

Numerous other features, objects, and advantages of the invention will become apparent from the following specification when read in connection with the accompanying drawing in which:

BRIEF DESCRIPTION OF THE DRAWING

FIG. 1a illustrates four bars to be scanned along an indicated pen scanning direction along their widths;

FIG. 1b is a graphical representation of scanning pen velocity as a function of the distance along the pen scanning direction for a typical manual scan;

FIG. 1c illustrates how the preceding pulse derived from scanning the four bars may be used as a reference for the pulse derived from scanning the next bar to determine whether that next bar is wide or narrow;

FIG. 2 is a pictorial representation, partially in section, of a suitable light pen according to the invention; and FIG. 3 illustrates the logical arrangement of a system for detecting for a "wide-narrow" ratio of four in accordance with the invention.

DETAILED DESCRIPTION OF PREFERRED EMBODIMENTS

With reference now to the drawing, and more particularly FIG. 1a thereof, there is shown an exemplary arrangement of width-coded bars for binarily encoding data. It is convenient to designate the narrow bars 1, 2 and 4 of width $d$ as representing logical ZERO and the wide bars of width $4d$ as logical ONE. As the hand moves a pen reader across pen scanning direction 11, the velocity may typically vary as a function of the distance along the scanning path represented in FIG. 1b. The resultant output pulses are represented in FIG. 1c, one above the other, to better illustrate how scanning a bar with increased pen velocity produces a pulse of shorter duration. If the scanning velocity were to remain constant at $V_o$ throughout the scan, pulses P1, P2 and P4 derived from scanning narrow bars 1, 2 and 4 would be of equal width and pulse P3 derived from scanning wide bar 3 would be four times as wide. It would only be necessary to double pulse P1 at the outset to obtain a reference for all succeeding pulses. Succeeding pulses of shorter and longer duration than that of this reference pulse would be interpreted as logical ZERO and ONE, respectively.

With the velocity increasing as represented in FIG. 1b, successive pulses become shorter. However, by doubling each short duration pulse and halving each long duration pulse according to the invention, a reference pulse is provided for comparison with the next data pulse to continuously adapt the system to changes in scan velocity.

As an example of a preferred technique according to the invention, it is convenient to have each encoded sequence begin with a narrow bar. As the pattern is scanned, the duration of the first pulse is measured and doubled to provide a signal, preferably a digital number signal, that is stored as the first reference. The duration of the second pulse is then measured and compared with the stored reference. Since in the specific example the duration of pulse P2 derive from scanning narrow bar 2 is smaller than the reference value, the pulse P2 is interpreted as logical ZERO and recorded as such. On the basis of this decision, its duration is doubled to provide a new reference signal that replaces the previous reference value. Then the duration of pulse P3 is measured and compared with the stored reference value. Since its duration is larger because derived from wide bar 3, pulse P3 is recorded as a logical ONE, and its duration divided by two to provide a new reference signal for comparison with the signal representative of the duration of pulse P4. Pulse P4 is interpreted as a ZERO, and its duration is therefore doubled to provide the new reference signal for the next pulse. This process is repeated until the last bar is interpreted.

The example just described is only one illustration of the process of successively recalibrating for variable speed scanning. It is within the skill of those having ordinary skill in this art to embody the principles of the invention in many different forms. The bar width ratio of 4:1 is probably more than necessary for most applications because velocity changes over practical recalibration intervals, typically a range of 0.01 to 0.3 inch, are usually small. For very short recalibration intervals, a ratio of 2 may well be adequate.

The initial bar does not have to be the narrow one. It could be the wide one or, for that matter, have any width of known relationship to the other code bars. Also, coarser recalibration can be done by using only the narrow bars or only the wide bars. Intervals between bars may also be used for recalibration, and it is immaterial whether bars or intervals are reflective or nonreflective, respectively. While only binary coding has been discussed, more references may be derived from each pulse (e.g., X2, X3 ... XN) to handle ternary and higher levels of coding.

Referring to FIG. 2, there is shown a combined block-pictorial representation of a system according to the invention. The light reading pen 12 comprises a hollow cylindrical housing formed with an aperture 13 at its tip for emitting and receiving light energy. A lamp 14, or other suitable source of radiant energy, emits light that is transmitted through bifurcated fiber optics 15 and focused by lens 16 upon the scanning plane 17'. Reflected energy is focused by lens 16 through bifurcated fiber optics 15 upon phototransistor 17 to produce an electrical signal, such as the pulses P1-P4, that are interpreted by the electronic decoder in electronic decoder and power supply 21.

Referring to FIG. 3, there is shown a block diagram illustrating the logical arrangement of a suitable system for detecting a wide-narrow ratio of four as in the example described. This choice simplifies the digital logic circuits because shifting a binary number one place to the left multiplies it by two while shifting it one place to the right divides it by two.

When optical detector 17 senses that a bar is being scanned and is up, it provides a signal that enables AND gate 22 to pass clock pulses from clock pulse generator 23 to binary counter 24. This count corresponds to a bar width and is compared by digital comparator 25 with the previous calibration value stored in up-down shift register 26 to provide a ONE signal on line 31 or ZERO signal on line 32 if the number in binary counter 24 is greater than or less than, respectively, the number in up-down shift register 26 and SHIFT RIGHT and SHIFT LEFT signals respectively for application to up-down shift register 26 to effect a corresponding shift in the number transferred from binary counter 24 to up-down shift register 26 immediately after comparison is made. Thus, the comparison effects an appropriate shift of one place in the transferred number which becomes the calibration value for the next bar. The specific techniques for accomplishing this are well known in the digital art and are not described herein so as not to obscure the principles of the invention.

Output storage register 33 then receives either a ONE or ZERO for each scan. Immediately after the transfer occurs, binary counter 24 is cleared so that it is in a condition to receive the next count. Preferably binary counter 24 is advanced serially and the number stored after scanning a bar is transferred parallelly to up-down shift register 26 and shifted immediately after transfer. At the conclusion of a scan, storage register 33 will contain a sequence of digital number signals representative of the bar code scanned.

There have been described economical, reliable, easy-to-use apparatus and techniques for manually scanning interval-coded patterns. It is evident that those skilled in the art may now make numerous uses and modifications of and departures from the specific apparatus and techniques herein disclosed without departing from the inventive concepts. Consequently, the invention is to be construed as embracing each and every novel feature and novel combination of features present in or possessed by the apparatus and techniques herein disclosed and limited solely by the spirit and scope of the appended claims.

What is claimed is:

1. A method of discriminating indicia defining different intervals of different widths along a predetermined scanning direction, the first of which defines a reference interval of reference width for providing a reference signal of reference duration, which method includes the steps of, scanning said indicia along said predetermined scanning direction at a rate subject to variation to provide corresponding electrical signals defining time intervals representative of the widths of said different intervals and the scanning rate, storing the first of said electrical signals defining time intervals to provide a stored reference signal, processing at least another of said electrical signals defining time intervals to alter said stored reference signal in accordance with any changes of the velocity of scanning said indicia so that the updated stored reference signal is representative of said reference width for the duration of each scan, and comparing each signal defining time intervals after the first with said stored reference signal as altered to provide an indication of the relative width of said intervals in the form of a sequence of digit signals each representative of the relationship of the associated interval widths relative to that of said reference interval width to always provide on each scan a sequence of as many digit signals as there are intervals of different widths after said reference interval identifying the sequence of digits represented by said intervals and always derived by the comparison of a signal defining time intervals after the first with the stored reference signal.

2. A method of discriminating indicia defining different intervals in accordance with claim 1 and further including establishing the duration between successive changes in said reference signal sufficiently short so that the width category of each scanned indicium is unambiguously indicated.

3. A method of discriminating indicia defining different intervals in accordance with claim 2 and further including the step of storing a sequence of said indications.

4. Apparatus for discriminating indicia defining intervals of different widths along a predetermined scanning direction representative of a sequence of digits comprising, transducing means for scanning said indicia at a rate subject to variations to provide corresponding electrical signals defining time intervals representative of said widths and said scanning rate, means for relatively displacing said transducing means and said indicia at said scanning rate subject to variation to provide said signals defining time intervals, means responsive to the first of said signals defining time intervals on a scan for providing a stored reference signal of reference time duration representative of the first interval width and said scanning rate when scanning said first interval, means responsive to at least another of said signals defining time intervals for updating said reference signal to alter said reference signal in accordance with any changes in said scanning rate so that the updated stored reference signal is representative of said first interval width for the duration of each scan, means for comparing each signal defining time intervals after the first with the stored reference signal to provide for each interval after the first a digit signal each representative of the relationship of the associated interval widths to that of the first interval width to always provide on each scan a sequence of as many digit signals as there are intervals after the first and always derived by the comparison of one of said signals defining time intervals with the stored reference signal, and means for establishing the duration between successive changes in the stored reference signal short enough so that the width category of each scanned interval is unambiguously indicated by comparison with the stored reference signal.

5. Apparatus for discriminating indicia in accordance with claim 4 and further comprising, a manually movable light pen reader comprising said transducing means for providing a sequence of pulses of time duration corresponding to said widths and said scanning rate, a source of clock pulses, a binary counter, gating means for transmitting said clock pulses to said binary counter to advance the count therein when enabled by a pulse provided by said light pen reader, an up-down shift register for receiving a count signal from said binary counter and shifting it up and down in response to first and second signals from said means for comparing to provide said stored reference signal therein, said means for comparing being responsive to the count in said counter being greater and less than said stored reference signal for providing said second and first signals respectively.

6. Apparatus for discriminating indicia defining intervals of different widths along a predetermined scanning direction in accordance with claim 5 and further comprising, storage register means for storing the sequence of said first and second signals provided by said means for comparing during each scan.

7. Apparatus for discriminating indicia defining intervals of different width along a predetermined scanning direction comprising, means including the first of said indicia defining a reference interval of reference width for providing a reference signal of reference time duration, means including others of said indicia spaced from said first indicia along said scanning direction defining data intervals of different widths along said scanning direction having a predetermined relationship to said reference width whereby the data represented by said data intervals may be unambiguously identified solely on the basis of comparison of a data interval width with said reference width, transducing means for scanning said indicia at a scanning rate subject to change to provide corresponding electrical signals defining time intervals representative of the width of said reference and data intervals, means for relatively displacing said transducing means and said indicia to provide said signals defining time intervals, means responsive to the first of said signals defining time intervals for storing said reference signal, means responsive to at least another of said signals defining time intervals for updating the stored reference signal to alter said stored reference signal in accordance with any changes in scanning velocity so that the updated stored reference signal is representative of said reference width for the duration of each scan, and means for comparing each signal defining time intervals after the first with said stored reference signal to provide an indication of the relative width of said intervals whereby each data signal derived on a scan is compared with said stored reference signal as updated on that scan to unambiguously identify the data represented by said data intervals solely on the basis of comparing the stored updated reference signal representative of said reference width and the substantially contemporary scanning velocity with each data signal representative of each data interval width on each scan, said means for comparing including means for providing for each data interval on a scan a digit signal each representative of the relationship of the associated data interval widths relative to that of said reference interval width to always provide on each scan a sequence of as many digit signals as there are data intervals identifying the sequence of digits represented by the data intervals and always derived by the comparison of a signal representative of a data interval width with the stored reference signal.

8. Apparatus in accordance with claim 7 wherein the duration between successive changes in said reference signal is short enough so that the width category of each scanned indicium is unambiguously indicated by comparison with the stored updated reference signal.

9. Apparatus in accordance with claim 8 wherein a first of said widths is four times a second of said widths.

10. Apparatus in accordance with claim 9 and further comprising means for effectively multiplying each signal representative of a second width by two and each signal representative of a first width by one half in providing said stored updated reference signal.

11. Apparatus in accordance with claim 10 and further comprising means for providing each of said signals defining time intervals and said reference signals in digital form.

12. Apparatus for discriminating indicia defining different intervals along a predetermined scanning direction comprising, transducing means for scanning said indicia to provide corresponding electrical signals defining time intervals representative of said different intervals, means for relatively displacing said transducing means and said indicia to provide said signals defining time intervals, means responsive to a first of said signals defining time intervals for providing a reference signal, means responsive to at least another of said signals defining time intervals for updating said reference signal to alter said reference signal in accordance with any changes in scanning velocity, means for comparing each signal defining time intervals after the first with said reference signal to provide an indication of the relative width of said intervals, the duration between successive changes in said reference signal being short enough so that the width category of each scanned indicium is unambiguously indicated by comparison with the reference signal, the first of said widths being four times a second of said widths, means for effectively multiplying each signal representative of a second width by two and each signal representative of a first width by one half to provide said reference signal, and means for providing each of said signals defining time intervals and said reference signals in digital form, said transducing means comprising a manually movable light pen reader, and said means for providing said signals in digital form comprising a source of clock pulses, a binary counter, gating means for transmitting said clock pulse to said binary counter to advance the count therein when enabled by a signal from said transducing means, an up-down shift register for receiving a count signal from said binary counter and shifting it up and down in response to first and second signals from said means for comparing to provide said reference signal therein, said means for comparing being responsive to the count in said counter being greater and less than said reference signal for providing said second and first signals respectively.

13. Apparatus in accordance with claim 12 and further comprising storage means for storing a sequence of said first and second signals to store a sequence of binary digits representative of a scanned sequence of said first and second widths.

* * * * *